United States Patent
Herndon

[11] 3,880,509
[45] Apr. 29, 1975

[54] WIDE-ANGLE ON-AXIS PROJECTION SYSTEM

[75] Inventor: John W. Herndon, Orlando, Fla.

[73] Assignee: The United States of America as represented by the Secretary of the Navy, Washington, D.C.

[22] Filed: Mar. 15, 1974

[21] Appl. No.: 451,635

[52] U.S. Cl. ............... 353/12; 35/12 N; 350/294; 350/299; 353/28; 353/69; 353/79; 353/99
[51] Int. Cl. .... G03b 21/28; G09b 9/08; G02b 5/10
[58] Field of Search ............ 353/11, 12, 13, 14, 28, 353/69, 79, 99, 122; 350/21, 293, 294, 299, 302; 35/12 N

[56] References Cited
UNITED STATES PATENTS
3,432,219  3/1969  Shenket et al. .................. 350/21
3,620,592  11/1971  Freeman .......................... 353/99

Primary Examiner—Richard E. Aegerter
Assistant Examiner—Steven L. Stephan
Attorney, Agent, or Firm—R. S. Sciascia; John W. Pease

[57] ABSTRACT

The invention provides a wide-angle common axis projection system wherein a reflector and a see-through beam splitter reflector are combined with a projector means having a wide angle lens and a display screen of spherical shape to develop on-axis image projection for wide-angle display in relation to a viewer's point located on the non-reflective side of the beam splitter reflector.

4 Claims, 2 Drawing Figures

WIDE-ANGLE ON-AXIS PROJECTION SYSTEM

BACKGROUND OF THE INVENTION

The invention is in the field of optics and is particularly useful in the field of visual aid training simulators.

There is a longstanding need in the field of image projection for wide-angle display systems, especially as applied to achieving visual simulation in the field of training devices. One such training device for which suitable visual techniques have been sought is a carrier landing simulator for aircraft. Various schemes which have been implemented or are under consideration include wide-angle systems using a plurality of projectors which achieve wide-angle display by contiguous smaller displays. Other systems use wide angle lenses but are off-axis, giving the image an improper perspective from the viewer's position.

SUMMARY OF THE INVENTION

In accordance with the subject invention there is combined with a spherically shaped display screen and projector means having wide-angle lens, a reflector and a beam splitter reflector arranged to reflect the projected image on the display screen while providing an on-axis view of the scene from an observer's position of view. The invention contemplates a conical shaped beam splitter reflector and a first reflector means which is horizontally circular and vertically dependent in curvature upon the intersection points of intersecting rays between the projector lens and the beam splitter reflector. Further, by selection a preferable 60° vertical image, as picked up by a TV camera, is condensed to a 30° vertical field-of-view by the projection lens to reduce the size of the first reflector means. The on-axis feature is obtained by placing the beam splitter reflector in front of the viewer so that the optical axis of the image reflected to the display screen and the optical axis of the viewer are in coincidence (on-axis), the beam splitter reflector mediating the optical path between viewer and final viewing (i.e., display) screen.

DESCRIPTION OF THE PREFERRED EMBODIMENTS

Figure 1:
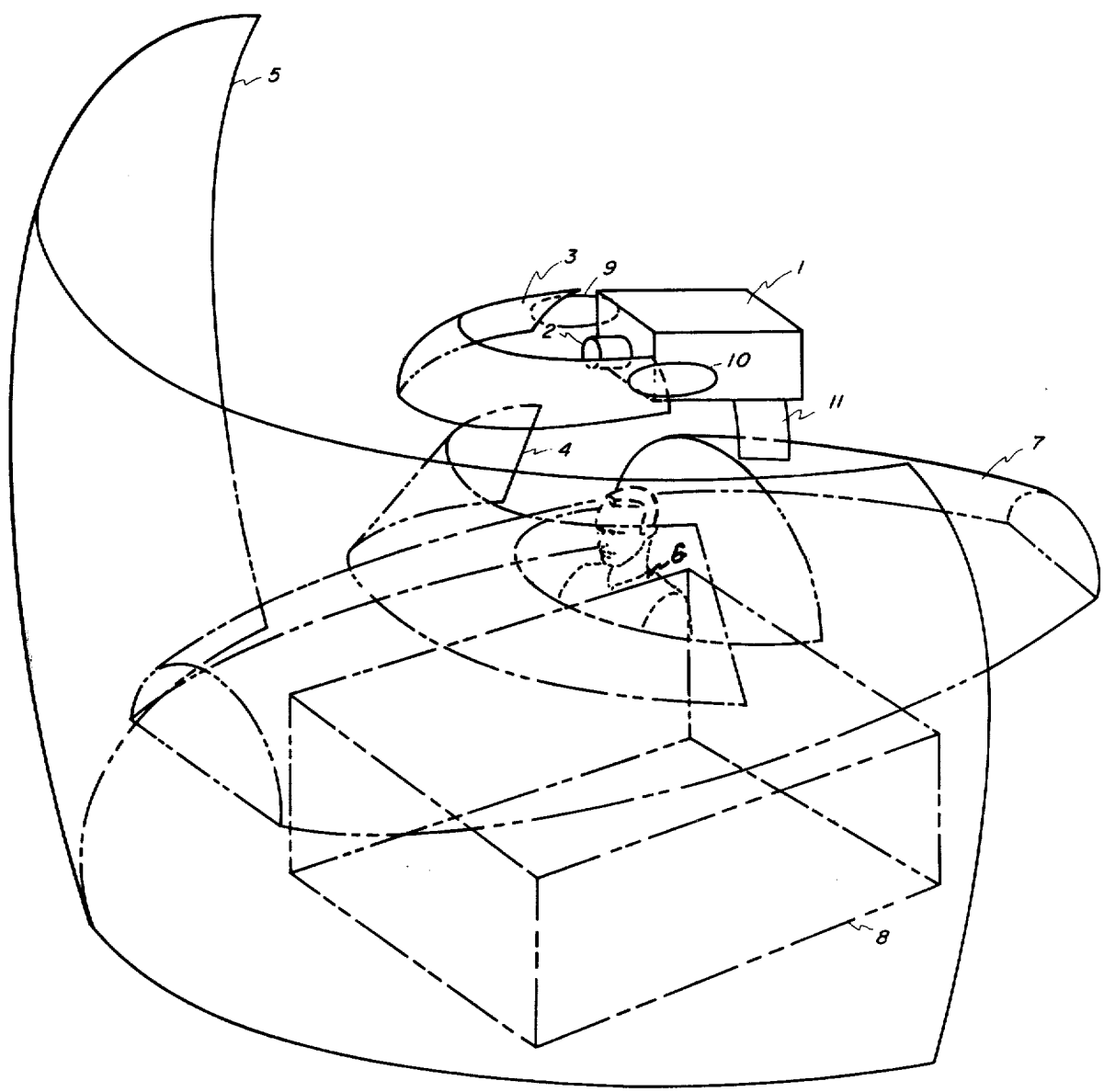
FIG. 1 is a conceptual diagrammatic sketch of the invention applied, as one example, to an aircraft training device.

Referring to the drawing, FIG. 1 shows, as an example of a device incorporating the invention, a visual aid simulator for aircraft training. Here, projector 1 is positioned so that an image is projected through a wide-angle lens 2 to a first reflector means 3 shaped to receive the full wide-angle image and reflect it downward to the rear, reflector side, of a see-through beam splitter reflector 4. Reflector 4 then reflects the projected image to a spherical contoured display screen 5. Beam splitter reflector 4 is partially silvered in the manner of a one-way mirror, or otherwise surface treated, so as to reflect a substantial magnitude of the image light while, at the same time, providing the viewer 6 an adequate view, through beam splitter 4, of the displayed image on display screen 5. In the example of FIG. 1, the viewer would be a trainee in a simulator cockpit 7. Projector 1, reflector 3, beam splitter reflector 4, display screen 5 and cockpit 7 are all mounted in fixed relationship and upon an associated device, as for example, a motion platform 8. Brackets 9, 10 and 11 indicate support means. In practice, more sophisicated means would be employed. Also in the example of FIG. 1, the lens 2, reflector 3, beam splitter reflector 4 and screen 5 are configured for 180° wide display. The vertical field of view in the preferred example is 60°.

Figure 2:
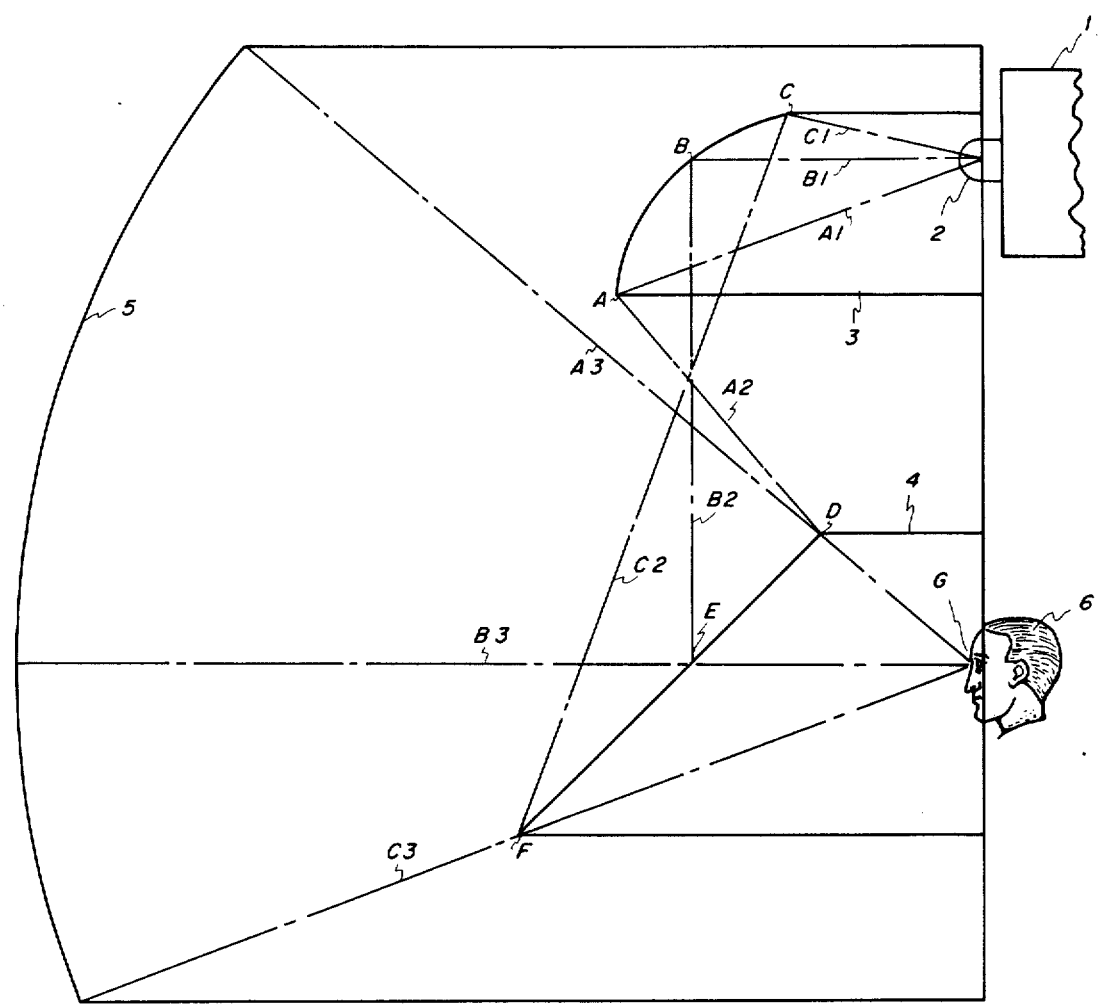
FIG. 2 is a diagrammatic view illustrating the principle of the reflecting rays and the elements of the system.

FIG. 2 illustrates the geometry of the system. In the preferred embodiment, the projection lens 2 is configured for 180° azimuth and 30° vertical field of view. The original scene vertical field of view is 60°. The reduction to 30° in the projection lens 2 allows a smaller first reflection 3 to be utilized.

The first reflector means 3 has a vertical contour generated by means of connecting all points of intersection of corresponding ray paths from lens 2 and beam splitter reflector 4. For example, ray A1 from lens 2 crosses ray A2 at point A. While in operation the projected ray follows a path, for instance, from lens 2 along A1 to point A where it is reflected along A2 to point D on the beam splitter reflector 4 and from point D along A3 to the display screen 5.

The requirements are set up in reverse. The vertical field of view is selected. In the example shown in FIGS. 1 and 2, a 60° vertical angle was selected with 40° above the horizontal and 20° below, all measured from a point G corresponding to the viewer's eye position. Ray path A3, being so established, determines the angle of A2 with respect to the beam splitter reflector 4. Similarly, all ray paths from the screen 5 have corresponding ray paths reflecting from the reflection, i.e., the rear surface of beam splitter reflector 4 and result in points of intersection with their corresponding ray paths from lens 2. These defined intersection points determine the vertical contour of first reflector means 3.

The horizontal contour of first reflector means 3 is circular. The beam splitter reflector means 4 is a 45° conical section. Both reflector 3 and beam splitter reflector 4 are, in this example, made for 180° wide-angle coverage.

Attention is directed to the feature that with a suitable 360° projection head at the center of first reflector means 3 and with the contours shown in FIG. 1 generated for 360° instead of 180° as shown, a 360° projection system may be provided. Also, the system need not be limited by the vertical and horizontal fields-of-view used as an example herein.

It will also be appreciated from the above that the invention provides a continuous, spherical, wide-angle field of view in projection utilizing a special arrangement of reflectors and screen including a see-through reflection type beam splitter. It will be further appreciated that the final ray paths to the display screen 5 are identical to the viewer's corresponding optical paths, thus achieving an on-axis wideangle projection system.

It is obvious in the light of the above teachings that modifications may be made in structure and arrangement without departing from the true spirit and scope of the invention, and it is intended that the appended claims relating to the invention be accorded as broad an interpretation as is consistent with the basic concepts herein taught.

What is claimed is:

1. A wide-angle common axis projecting and viewing display system comprising:

a. a difusing type display screen,
b. projector means having a wide-angle lens for projecting image light rays,
c. a first reflector means for receiving said rays,
d. a see-through beam splitter reflector means being surfaced to provide a beam splitter effect and positioned to receive and reflect to said display screen said rays from said first reflector means while acting as a see-through window for a viewer monitoring said display screen along line of sight paths from a viewing point,
e. said first reflector and beam splitter reflector means being relatively shaped in curvature to cause all projected rays in each azimuth plane to pass through a common point, said point being also the mirror image of said viewing point such that the line of sight paths to said beam splitter reflector from said viewing point and the corresponding paths of projection rays reflected to said screen are collinear and represent the true vertical angles of the scene and thus constitute an on-axis system to present a real image on said display screen without peripheral distortions.

2. Apparatus according to claim 1 wherein
a. said beam splitter reflector is partially silvered in the manner of a one-way mirror to reflect a substantial magnitude of the image light while at the same time providing the viewer from an adequate view, through said beam splitter reflector, of the image displayed on said display screen.

3. Apparatus according to claim 1 wherein
a. said display screen is a spherical segment,
b. said first reflector means is circular in horizontal contour,
c. said beam splitter reflector is a 45 degree conical section, and
d. said first reflector means has a vertical contour generated by means of connecting all points of intersection of corresponding ray paths from said projector lens and from said beam splitter reflector as corresponding to rays between said beam splitter reflector and said display screen and under said conditions of collinear line of sight and reflected projector ray paths.

4. Apparatus according to claim 3
a. said projector lens providing a 30° vertical projection and
b. said vertical curvature of said first reflector means corresponding to a 60° vertical projection on said display screen.

* * * * *